United States Patent [19]

Wiggins et al.

[11] Patent Number: 5,623,019
[45] Date of Patent: Apr. 22, 1997

[54] COMPATIBILIZED THERMOPLASTIC MOLDING COMPOSITION

[75] Inventors: Jeffrey S. Wiggins, Pittsburgh, Pa.; Harald Pielartzik, Krefeld, Germany; Robert J. Kumpf; Joachim Franke, both of Pittsburgh, Pa.; Clifford J. Lau, Sewickley, Pa.

[73] Assignee: Bayer Corporation, Pittsburgh, Pa.

[21] Appl. No.: 502,112

[22] Filed: Jul. 13, 1995

[51] Int. Cl.$^6$ ............ C08L 23/02; C08L 75/04; C08L 53/02
[52] U.S. Cl. .................................. 525/92 C; 525/130
[58] Field of Search .............................. 525/92 C, 130

[56] References Cited

U.S. PATENT DOCUMENTS

| | | | |
|---|---|---|---|
| 3,272,890 | 9/1966 | O'Leary, Jr. | 260/859 |
| 3,310,604 | 3/1967 | Steingiser et al. | 260/859 |
| 3,351,676 | 11/1967 | Saunders et al. | 260/859 |
| 3,358,052 | 12/1967 | Archer, Jr. | 260/859 |
| 3,929,928 | 12/1975 | Wolf, Jr. et al. | 260/859 R |
| 4,088,627 | 5/1978 | Gergen et al. | 260/42.18 |
| 4,107,130 | 8/1978 | Gergen | 525/92 |
| 4,107,131 | 8/1978 | Gergen | 525/92 |
| 4,410,595 | 10/1983 | Matsumoto et al. | 428/412 |
| 4,423,185 | 12/1983 | Matsumoto et al. | 525/66 |
| 4,429,076 | 1/1984 | Saito et al. | 525/57 |
| 4,499,238 | 2/1985 | Iwata et al. | 525/98 |
| 4,795,782 | 1/1989 | Lutz et al. | 525/66 |
| 4,883,837 | 11/1989 | Zabrocki | 525/66 |
| 4,906,687 | 3/1990 | Modic | 525/57 |
| 4,939,207 | 7/1990 | Fasulo et al. | 525/89 |
| 5,034,449 | 7/1991 | Mallikarjun | 524/504 |
| 5,187,236 | 2/1993 | Coolbaugh et al. | 525/314 |
| 5,198,495 | 3/1993 | Fasulo et al. | 525/71 |
| 5,248,729 | 9/1993 | Inoue et al. | 525/92 |
| 5,256,734 | 10/1993 | Sugihara et al. | 525/98 |

FOREIGN PATENT DOCUMENTS

| | | |
|---|---|---|
| 49-9831 | 3/1974 | Japan . |
| 088834 | 4/1991 | Japan . |

OTHER PUBLICATIONS

Chemical Abstract 123:230849.
Chemical Abstract 98:161834.
Polyurethane–Polypropylene Blends; Z.S. Petrovic et al in Journal of Applied Polymer Science, vol. 42, 779 (Month unavailable) 1991.

*Primary Examiner*—David Buttner
*Attorney, Agent, or Firm*—Joseph C. Gil; Aron Preis

[57] ABSTRACT

A compatibilized thermoplastic molding composition containing polyurethane and polyolefin resins is disclosed. Accordingly, a particularly structured copolymer having a number average molecular weight of about 25,000 to 350,000 and containing blocks of monoalkylene arene and either hydrogenated conjugated diene or non-hydrogenated conjugated diene, was found to compatibilize the composition. Articles molded from the composition are characterized by their good mechanical properties.

18 Claims, No Drawings

COMPATIBILIZED THERMOPLASTIC MOLDING COMPOSITION

FIELD OF THE INVENTION

This invention related to thermoplastic molding compositions containing polyurethane and polyolefin resins.

SUMMARY OF THE INVENTION

A compatibilized thermoplastic molding composition containing polyurethane and polyolefin resins is disclosed. Accordingly, a particularly structured copolymer having a number average molecular weight of about 25,000 to 350,000 and containing blocks of monoalkylene arene and either hydrogenated conjugated diene or non-hydrogenated conjugated diene, was found to compatibilize the composition. Articles molded from the composition are characterized by their good mechanical properties.

BACKGROUND OF THE INVENTION

Except at the lowest levels of incorporation of one resin in the other, thermoplastic polyurethane (herein TPU) and polyolefin (herein PO) are intrinsically incompatible. It has been suggested that TPU/PO blends might offer advantages in terms of cost, mechanical properties, hydrolytic and thermal stability, stain and solvent resistance, and good adhesion to polyolefin substrates and efforts to make these components compatible one with the other have been reported. Blends made with conventional processing equipment, such as a twin screw extruder, tend to separate during the melt blending procedure into the individual phases. The separation is believed attributable to the large differences in solubility parameters between these resins, resulting in the creation of interfacial tension between the non-polar polyolefin and highly polar polyurethane. As a consequence of separation, the blends display poor physical properties. This incompatibility is manifested by either the lowering of some measured physical property to a value below that for either one of the components, or by visual observation of separation (for instance, fracture or crumbling). The difficulty in preparing relevant blends, especially blends containing more than 30% polyurethane, has been disclosed in the article "Polyurethane-Polypropylene Blends", Z. S. Petrovic et al in J. Appl. Polym. Sci. 42, 1991 pp. 779. U.S. Pat. No. 3,272,890 discloses blends of polyurethane and polyethylene. The method of preparation of the blend entails melting and fluxing the polyethylene in a Banbury mixer and then adding the polyurethane. Systems containing dispersed polyethylene in polyurethane have been disclosed in U.S. Pat. Nos. 3,310,604; 3,351,676; and 3,358,052; other relevant blends having improved processability have been disclosed in U.S. Pat. No. 3,929,928.

U.S. Pat. Nos. 4,410,595 and 4,423,185 disclose compositions containing thermoplastic polyurethanes and polyolefins, the later being modified with functional groups including carboxylic acid anhydride. Japanese Patent Application 74,9831 (Derwent Abstract 24216V) discloses modified ionomer polymer blends containing polyurethane and polyethylene.

Relevant block copolymers have been disclosed in U.S. Pat. Nos. 4,499,238 and 5,256,734. The '734 patent disclosed a composition containing 100 parts of polypropylene and 20 to 100 parts of hydrogenated styrene/butadiene or styrene isoprene elastomeric block copolymers. The composition is understood to provide molded articles having low mold shrinkage and linear expansion coefficient. Relevant block copolymers have also been disclosed in U.S. Pat. Nos. 5,187,236; 5,198,495; 5,034,449; and 5,248,729.

The preparation of a multi-component polymer blend containing a polyurethane, a specifically structured, selectively hydrogenated, monoalkenyl arene-diene block copolymer and a dissimilar engineering resin has been disclosed in U.S. Pat. No 4,107,131. Polyolefin is among the dissimilar resins. Plastic compositions containing a polyamide, a functionalized polyolefin and an acid-grafted elastomer have been disclosed in U.S. Pat. No. 4,795,782. Also relevant for their disclosure of block copolymers as compositional components of thermoplastic molding compositions are U.S. Pat. Nos. 4,429,076; 4,906,687 and 4,939,207.

Of particular relevance in the present context is U.S. Pat. No. 4,883,837 which disclosed compatible compositions containing a polyolefin, a thermoplastic polyurethane and as a compatibilizing agent, a modified polyolefin. The modified polyolefin thus disclosed is an olefinic copolymer containing functional groups. Further of particular relevance are U.S. Pat. Nos. 4,107,131 and 4,088,627 which disclosed compatibilized TPU compositions containing polyolefins and relevant compatibilizing agents.

DETAILED DESCRIPTION OF THE INVENTION

In accordance with the invention, there is provided a thermoplastic molding composition comprising a homogeneous resinous mixture of (i) about 1 to 99, preferably about 30 to 90 percent TPU, (ii) about 99 to 1, preferably about 10 to 70 percent of a polyolefin and (iii) about 0.5 to 10, preferably 1 to 8, most preferably 2 to 5 percent of a compatibilizing agent comprising a particularly structured copolymer containing blocks of monoalkylene arene and either hydrogenated conjugated diene or non-hydrogenated conjugated diene, the percents being relative to the weight of the resinous mixture.

The thermoplastic polyurethanes which are suitable in the present invention include the ones which are based on polyester polyol or a polyether polyol and are substantially linear polymers and have thermoplastic processing characteristics. Typically, these may be prepared from the reaction of an organic polyisocyanate, preferably a diisocyanate with a polyol composition which may contain a polycaprolactone polyol, or a polyester polyol and a chain extender. The thermoplastic polyurethane can be prepared by methods as disclosed in U.S. Pat. Nos. 3,214,411 and 4,376,834, the teachings of which are incorporated herein by reference. These materials are well known in the art and are readily available in commerce. Representative documents disclosing the preparation of TPU include "Polyurethanes: Chemistry and Technology", Part II, Saunders and Frisch, 1964, pp 767 to 769, Interscience Publishers, New York, N.Y. and "Polyurethane Handbook", Edited by G. Oertel, 1985, pp 405 to 417, Hanser Publications, distributed in U.S.A. by Macmillan Publishing Co., Inc., New York, N.Y. Also relevant are U.S. Pat. Nos. 2,929,800; 2,948,691; 3,493,634; 3,620,905; 3,642,964; 3,963,679; 4,131,6114; 4,169,196; U.S. Pat. No. Reissue 31,671; U.S. Pat. No. 4,245,081; 4,371,684; 4,379,904; 4,447,590; 4,523,005; 4,621,113; and 4,631,329 the disclosures of which are incorporated herein by reference.

Essentially, the TPU of the invention may be prepared from an organic diisocyanate, at least one polyester polyol, or polyether polyol (preferably diols) and at least one difunctional extender. It may be prepared by the prepolymer, quasiprepolymer, or one-shot methods in accordance with methods described in the relevant literature.

Although the compatibility in accordance with the invention is not a function of the melt flow rate of TPU, it is preferred that the melt flow be in the range of 1 to 60 g/10 min. when measured at 205° C. under a load of 8.7 Kg., determined according to ASTM D-1238.

The polyols which can be used are those conventionally employed in the art for the preparation of TPU elastomers. These have molecular weights (number average) falling in the range of 400 to 4,000, and, preferably 500 to 3,000. It is not unusual, and, in some cases, it can be advantageous to employ more than one such polyol. Exemplary of suitable polyols are polyester diols, polyether polyols, hydroxy-terminated polycarbonates, hydroxy-terminated polybutadienes, hydroxy-terminated polybutadiene-acrylonitrile copolymers and hydroxy-terminated copolymers of dialkyl siloxane and mixtures in which any of the above polyols are employed as a major component (greater than 50% w/w) with polyether polyols or amine-terminated polyethers and amine-terminated polybutadiene acrylonitrile copolymers.

Illustrative of polyester polyols are those prepared by polymerizing ε-caprolactone using an initiator such as ethylene glycol, ethanolamine and the like, and those prepared by esterification of polycarboxylic acids such as phthalic, terephthalic, succinic, glutaric, adipic azelaic and the like acids with polyhydric alcohols such as ethylene glycol, butanediol, cyclohexanedimethanol and the like.

Particularly useful polyester polyols are those produced from divalent carboxylic acids or the anhydrides of these acids and a glycol having at least one, preferably two primary hydroxyl groups. Suitable divalent carboxylic acids include succinic acid, suberic acid, sebacic acid, oxalic acid, methyladipic acid, glutaric acid, pimelic acid, azelaic acid, phthalic acid, terephthalic acid, isophthalic acid and the like, and anhydrides of the above. Polyester polyols prepared from adipic acid are especially preferred.

By way of example, adipic acid is condensed with a suitable glycol or mixtures of glycols which have at least one primary hydroxyl group. The condensation is stopped when an acid number of from about 0.5 to about 2.0 is reached. The water formed during the reaction is simultaneously removed so that the final water content of the resulting product is from about 0.01 to about 0.02, preferably from about 0.01 to about 0.05 percent by weight.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethylpropylene glycol, 1,3-propylene glycol and the like. In addition to the glycols, a small amount of trihydric alcohol, up to about 1 percent may be used along with the glycols such as, for example, trimethylolpropane, glycerine, hexanetriol and the like. The molecular weight of the polyester polyol can be increased if desired by further reacting with an oxirane such as, for example, ethylene oxide or propylene oxide.

The suitable polyether polyols include polyoxyethylene glycols, polyoxypropylene glycols, copolymers of ethylene oxide and propylene oxide, polytetramethylene glycols, copolymers of tetrahydrofuran and ethylene oxide and/or propylene oxide. The preferred polyether polyols are copolymers of ethylene and propylene oxide.

The preferred polyol has a molecular weight of at least 500, more preferably at least 1250, and most preferably at least 2000, but less than 20,000, preferably less than 10,000 and more preferably less than 8000. The functionality of the polyol, number of isocyanate-reactive hydrogens per molecule, is preferably not greater than 6, and more preferably, the functionality is in the range of 2 to 4.

Any of the organic polyisocyanates and diisocyanates employed in the preparation of polyurethanes can be employed in preparing the TPU of the present invention. Illustrative of such isocyanates are: methylene bis(phenylisocyanates) including the 4,4'-isomer, the 2,4'-isomer and mixtures thereof, meta- and paraphenylene diisocyanates, chlorophenylene diisocyanates, α,α'-xylylene diisocyanate, 2,4-and 2,6-toluene diisocyanate and mixtures of these latter two isomers which are available commercially, toluene diisocyanate, hexamethylene diisocyanate, 1,5-naphthalene diisocyanate, isophorone diisocyanate and methylene bis-(cyclohexylisocyanate), including the 4,4'-isomer and 2,4'-isomer, and mixtures thereof.

Preferably, the organic polyisocyanate employed to prepare the TPUs useful in this invention is methylene bis(phenylisocyanate) in the form of the 4,4'-isomer as well as mixtures of the 4,4'-isomer with amounts (up to about 70 percent by weight) of the 2,4'-isomer and modified forms of these diisocyanates. By the latter are meant those forms of methylene bis(phenylisocyanate) which have been treated to render them stable liquids at ambient temperature. Such products include those which have been reacted with a minor amount (up to 0.2 equivalents per equivalent of a polyphenyl polyisocyanate) of an aliphatic glycol or mixture of aliphatic glycols; such modified methylene bis(phenylisocyanates) are described in U.S. Pat. Nos. 3,394,164; 3,883,571; 4,115,429; 4,118,411 and 4,299,347; and those wherein a minor amount of the diisocyanate has been converted to the corresponding carbodiimide as described in U.S. Pat. No. 3,384,653. Mixtures of the above-described polyisocyanates can be employed if desired. The preferred organic diisocyanates include the aromatic and cycloaliphatic diisocyanates. Most preferred are methylenebis(phenylisocyanate) including the 4,4'-isomer, the 2,4'-isomer, and mixtures thereof, and methylenebis(cyclohexyl isocyanate) inclusive of the isomers described above.

The difunctional extender employed can be any of those known in the TPU art disclosed above. Typically, the extenders can be aliphatic straight and branched chain diols having from 2 to 10 carbon atoms, inclusive, in the chain. Illustrative of such diols are ethylene glycol 1,3-propanediol, 1,4-butanediol, 1,5-pentanediol, 1,6-hexanediol, neopentyl glycol, and the like; 1,4-cyclohexanedimethanol; hydroquinone bis-(hydroxyethyl)ether; cyclohexylene diols (1,4-, 1,3-, and 1,2-isomers), isopropylidene bis(cyclohexanols); diethylene glycol, dipropylene glycol, ethanolamine, N-methyldiethanolamine, and the like; and mixture of any of the above. As noted previously, in some cases minor proportions (less than about 20 equivalent percent) of the difunctional extender may be replaced by trifunctional extenders without detracting from the thermoplasticity of the resulting TPU; illustrative of such extenders are glycerol, trimethylolpropane and the like.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol and 1,4-cyclohexane dimethanol. Also included among the chain extenders which can be used in preparing TPU are adducts obtained by an aliphatic diol or triol such as 1,4-cyclohexane dimethanol, neopentyl glycol, hexane-1,2-diol, ethylene glycol, butane-1,4-diol, trimethylolpropane, and the like, with caprolactone in a mole ratio of from 0.01 to 2 moles of caprolactone per mole of diol or triol.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time, the overall ratio of isocyanate equivalents to equivalents of active hydrogen containing materials is within the range of 0.90:1 to 1.10:1, and preferably, 0.95:1 to 1.05:1.

While any of the diol extenders described and exemplified above can be employed in preparing the thermoplastic polyurethane, alone, or in admixture, it is preferred to use 1,4-butanediol, neopentyl glycol, 1,4-cyclohexane dimethanol, ethylene glycol and diethylene glycol either alone or in admixture with each other.

The TPU forming ingredients can be reacted in organic solvents but are preferably reacted in the absence of solvent by melt-extrusion at a temperature of from about 125° C. to about 250° C., preferably from about 160° C. to about 225° C.

Preferably, the chain extender and the polyol, each of which has been previously heated, are first mixed and the resulting mixture is mixed with the heated polyisocyanate. This method is preferred for the reason that the extender and the polyester will not react prior to the introduction of polyisocyanate and rapid mixing with the polyisocyanate is thus facilitated.

Advantageously, the rate of reaction may be increased by adding any suitable catalyst to the reaction mixture such as tertiary amines and the like set forth in U.S. Pat. Nos. 2,620,516; 2,621,166 and 2,729,618 all incorporated herein by reference. Any of the catalysts conventionally employed in the art to catalyze the reaction of an isocyanate with a reactive hydrogen containing compound can be employed for this purpose; see, for example, Saunders et al., "Polyurethanes: Chemistry and Technology", Part I, Interscience, New York, 1963, pages 228–232; see also, Britain et al., J. Applied Polymer Science, 4, pages 207–211, 1960. Such catalysts include organic and inorganic acids salts of and organometallic derivatives of bismuth, lead, tin, iron, antimony, uranium, cadmium, cobalt, thorium, aluminum, mercury, zinc, nickel, cerium molybdenum, vanadium, copper, manganese and zirconium, as well as phosphines and tertiary organic amines. Representative organotin catalysts are stannous octoate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

Other techniques for the production of thermoplastic polyurethanes useful in the context of the present invention are disclosed in the text "Polyurethanes: Chemistry and Technology", Vol. 2, pp. 299–452 by J. H. Saunders and K. C. Frisch, Interscience Publishers, New York (1964) incorporated herein by reference.

The above and other thermoplastic polyurethanes such as disclosed in U.S. Pat. Nos. 2,621,166; 2,729,618; 3,214,411; 2,778,810 and 4,376,834, Canadian Patents 754,233; 733,577 and 842,325, all incorporated herein by reference, which are suitable in the context of the presently described invention, may be used to prepare the thermoplastic compositions of the present invention.

The polyolefins useful in the present context are crystalline or crystallizable $C_2$–$C_5$-poly(alpha-olefins) and their copolymers having a molecular weight (number average molecular weight) of at least 10,000 preferably at least 50,000. Preferably, the crystalline melting point of the suitable polyolefins is above 100° C., more preferably about 100° to 250° C. Among the examples of suitable olefins, mention may be made of low and high density polyethylene and polypropylene, poly-3-methylbutene-1-polybutene-1, poly-4-methylpentene-1. Also suitable are copolymers of mono olefins with mono-or diolefins or with vinyl monomers. Included are ethylene-propylene copolymers (optionally with one or more additional monomers, for instance EPDM) ethylene-vinyl acetate copolymer; ethylene-butylene copolymer; ethylene-vinyl acrylate copolymer; ethylene-acrylic acid; propylene-4-methylpentene-1 copolymer; ethylene-methacrylic acid copolymer; as well as their respective ionomers. The preparation of these polyolefins is known—see for instance "Olefin Polymers" Vol 14 Kirk Othmer Encyclopedia of Chemical technology pp. 217–335 (1967).

The high density polyethylene employed has an approximate crystallinity of over about 75% and a density in grams per cubic centimeter ($g/cm^3$) of between about 0.94 and 1.0 while the low density polyethylene employed has an approximate crystallinity of over about 35% and a density of between about 0.90 $g/cm^3$ and 0.94 $g/cm^3$. Most commercial polyethylenes have a number average molecular weight of about 50,000 to about 500,000.

The polypropylene employed is the so-called isotactic polypropylene as opposed to atactic polypropylene. This polypropylene is described in the above Kirk-Othmer reference and in U.S. Pat. No. 3,112,300. The number average molecular weight of the polypropylene employed is typically in excess of about 100,000. The polypropylene suitable for this invention may be prepared using methods of the prior art. Depending on the specific catalyst and polymerization conditions employed, the polymer produced may contain atactic as well as isotactic, syndiotactic or so-called stereo-block molecules. These may be separated, if desired, by selective solvent extraction to yield products of low atactic content that crystallize more completely. The preferred commercial polypropylenes are generally prepared using a solid, crystalline, hydrocarbon-insoluble catalyst made from a titanium trichloride composition and an aluminum alkyl compound, e.g., triethyl aluminum or diethyl aluminum chloride. If desired, the polypropylene employed may be a copolymer containing minor (1 to 20 percent by weight) amounts of ethylene or other alpha-olefin comonomers.

The poly(1-butene) preferably has an isotactic structure. The catalysts used in preparing the poly(1-butene) are typically organometallic compounds commonly referred to as Ziegler-Natta catalysts. A typical catalyst is the interacted product resulting from mixing equimolar quantities of titanium tetrachloride and triethylaluminum. The manufacturing process is normally carried out in an inert diluent such as hexane. Manufacturing operation, in all phases of polymer formation, is conducted in such a manner as to guarantee rigorous exclusion of water even in the trace amounts.

One very suitable polyolefin is poly(4-methyl-1-pentene). Poly(4-methyl-1-pentene) typically has an apparent crystalline melting point of between about 240° and 250° C. and a relative density of between about 0.80 and 0.85. Monomeric 4-methyl-1-pentene is commercially manufactured by the alkali-metal catalyst dimerization of propylene. The homopolymerization of 4-methyl-1-pentene with Ziegler-Natta catalysts is described in the Kirk-Othmer Encyclopedia of Chemical Technology, Supplement Volume, pages 789–792 (Second Edition, 1971). However, the isotactic homopolymer of 4-methyl-1-pentene has certain technical defects, such as brittleness and inadequate transparency. Therefore, commercially available poly(4-methyl-1-pentene) is actually a copolymer with minor proportions of other alpha-olefins, together with the addition of suitable oxidation and melt stabilizer systems. These copolymers are described in the Kirk-Othmer Encyclopedia of Chemical Technology, Supplement Volume, pages 792–907 (Second Edition, 1971), and are available from Mitsui Chemical Company under the tradename TPX® resin. Typical alpha-olefins are linear alpha-olefins having from 4 to 18 carbon atoms. Suitable resins are copolymers of 4-methyl-1-pentene with from about 0.5 to about 30% by weight of a linear alpha-olefin.

The preferred olefinic component of the inventive composition is at least one member selected from the group consisting of polyethylene, polypropylene and TPO (TPO refers to a blend of polypropylene with an elastomer).

The compatibilizer of the present invention is a copolymer having a number average molecular weight of about 25,000 to 350,000, preferably 35,000 to 300,000 containing blocks of monoalkenyl arene (herein A) having a number average molecular weight of about 5,000 to 125,000, preferably 7,000 to 60,000 and either hydrogenated conjugated diene (herein HB) or non-hydrogenated conjugated diene (herein B), having a number average molecular weight of about 10,000 to 250,000, preferably 30,000 to 150,000, the structure of which conforms to any one of the following:

(a) linear di-blocks, (b) linear and branched tri-blocks containing no HB blocks, (c) linear and branched tri-blocks containing HB blocks wherein said A comprises at least 56% relative to the weight of said tri-block, (d) radial block containing no HB blocks, (e) radial block containing HB blocks wherein said A comprises at least 56% relative to the weight of said radial block, (f) radial block containing HB blocks as end-groups, (g) linear multi-blocks containing at least one HB as an end block, and (h) linear multi-blocks containing B.

In the context of the above description, the term "multi-blocks" denotes a structure containing four or more blocks. The term "monoalkenyl arene" refers to any of the group of styrene, methyl styrene and ring substituted styrene. The term "di-block copolymers" denoted copolymers containing tapered segments or non-tapered segments. Tapered blocks are recognized in the art and have been disclosed in U.S. Pat. No. 3,265,765; 3,251,905; 4,208,356 and 3,639,521 as well as in Crouch, W. W., and Short, J. N. (1961) Rubber Plast. Age 42:276 and in Railsback, H. E., Baird, C. C., Haws, J. R., and Wheat, R. C., (1964) Rubber age 94: 583 which are incorporated herein by reference.

In the context of the present invention, a linear diblock denotes a copolymer that is a single sequence of monomer A units connected to a single sequence of monomer B units. These diblocks are exemplified by AB and AHB.

The term tri-block denotes a copolymer having a monomer A or B flanked on its sides by the complementary block of monomer units. Examples are ABA, AHBA, BAB and HBAHB.

The term radial block denotes copolymers having three or more polymer chains extending from a central hub with one of the sequences of the monomer units attached to the outer end of each of the polymer chains that extends from the central hub. The following structures are examples:

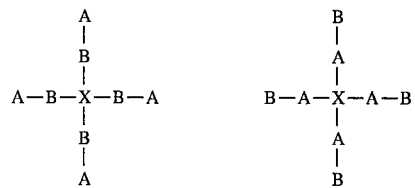

Except for the compatibilizers designated above as (c) and (e), it is preferred that the content of monoalkenyl arene in the compatibilizer shall be about 20 to 75 percent, preferably 40 to 70 percent relative to the weight of the compatibilizing copolymer.

The preparation of the copolymeric compatibilizing agents of the present invention has been disclosed in the literature, including U.S. Pat. No. 4,499,238; 5,256,734; 5,187,236; 5,198,495; 5,034,449; 5,248,729; 4,107,131; 4,795,782; 4,429,076; 4,906,687; 4,883,837 and 4,939,207, the disclosures of which are incorporated herein by reference.

Commercial products such as Stereon 840-A from Firestone (a butadiene-stryrene di-block copolymer) Shell's Kraton 6403 (a di-block and a tri-block of polystyrene-polyisoprene-polystyrene) and Kraton 1125X (a tri-block copolymer of polystyrene-polyisoprene-polystyrene), and Kuraray's Septon 2104 are examples of copolymers which are readily available and which were found to be useful as compatibilizers in the present inventive composition.

The efficacy of the compatibilizer of the invention may be appreciated upon scanning electro-micrographs of the fracture surfaces of articles molded from the inventive composition and upon evaluating the properties of articles molded therefrom.

The preparation of the inventive blends of the present invention may be carried out conventionally. For instance, the components may be first dry-blended followed by fluxing the mixture in any of the known means for dry-blending and/or melt-compounding solids. The blends must be completely melted in the molding operation. Illustratively, the components in pelletized form can be brought together and dry-blended using conventional means such including a barrel or tumble mixer, rubber mill, Henschel mixer, Danbury mixer, and the like. The components may then be compounded in an appropriate melt-extruder, or the like. The mixing and melt-blending may be carried out in one step by bringing the components together directly in a melt-compounding apparatus (for instance, single or twin-screw extruders) and by producing strands which may then be chopped, pelletized, or otherwise comminuted prior to any subsequent molding steps. While the compounding or fluxing temperature is not critical, it is necessary that the three components be fused together but not thermally degraded. Advantageously, the blending may be carried out at about 125° to about 325° C., preferably from about 150° to about 250° C.

If desired, the compositions of the invention may have incorporated in them, at any appropriate stage of preparation, additives such as pigments, fillers, mold release agents, lubricants, stabilizers, antioxidants, coloring agents, fire retardants, and the like, which are commonly used in conjunction with polyurethane elastomers.

The invention is further illustrated but is not intended to be limited by the following examples in which all parts and percentages are by weight unless otherwise specified.

EXAMPLES

Experimental

In the preparation of the compositions which are described below, use was made of a 30 mm twin-screw laboratory extruder. The twin screws comprised about 65% conveying elements and about 35% kneading end mixing elements. The extruder had an L/D ratio of 36 and was run at about 300 rpm with a throughput of about 60 lbs/hour. The process zones were individually controlled as to temperature as follows:

| Zone 1 (feed) | 160–180° C. |
| Zone 2 (process) | 170–210° C. |
| Zone 3 (process) | 180–220° C. |
| Zone 4 (process) | 180–220° C. |
| Zone 5 (process) | 190–225° C. |
| Zone 6 (die) | 190–230° C. |

Example 1

A composition in accordance with the invention containing a blend of 5.5 parts by weight (pbw) of a polyester based thermoplastic polyurethane (herein TPU-EST), 4.0 pbw of polypropylene and 0.5 pbw of a styrenic di-block copolymer was prepared by melt blending in the extruder. The tapered di-block copolymer, represenative of (a) above, contains about 43% (weight percent) styrene and about 57% butadiene. A comparative blend of 6.0 pbw of TPU-EST and 4.0 pbw of polypropylene was similarly prepared. The properties of these compositions are summarized below in Table 1.

TABLE 1

| Example | TPU-EST pbw | PP pbw | DiBlock pbw | Tensile Strength (Kpsi) | Elongation (%) |
|---|---|---|---|---|---|
| a | 6.0 | 4.0 | 0.0 | 1.36 | 128 |
| b | 5.5 | 4.0 | 0.5 | 2.10 | 418 |

The addition of the styrenic di-block copolymer is seen to cause a significant increase in the tensile strength and the elongation of the composition.

Example 2

A composition in accordance with the invention containing a blend of 5.5 pbw of TPU-EST, 4.0 pbw of polypropylene and 0.5 pbw of a styrenc tri-block copolymer was prepared by melt blending in the extruder. The tri-block copolymer, representative of (b) above, contains about 30% (weight percent) styrene and about 70% isoprene. The properties of a comparative blend which contains 6.0 pbw of TPU-EST and 4.0 pbw of polypropylene are tabulated below for comparison—see Table 2.

TABLE 2

| Example | TPU-EST pbw | PP pbw | tri-Block pbw | Tensile Strength (Kpsi) | Elongation (%) |
|---|---|---|---|---|---|
| a | 6.0 | 4.0 | 0.0 | 1.36 | 128 |
| c | 5.5 | 4.0 | 0.5 | 2.10 | 434 |

Example 3

A composition in accordance with the invention containing a blend of 5.5 pbw of TPU-EST, 4.0 pbw of polypropylene and 0.5 pbw of a styrenic tri-block copolymer was prepared by melt blending in the extruder. The tri-block copolymer, representative of (c) above, contains about 65% (weight percent) styrene and about 35% ethylene-propylene (ethylene:propylene=1:1). The properties of a comparative blend which contains 6.0 pbw of TPU-EST and 4.0 pbw of polypropylene are tabulated below for comparison—see Table 3.

TABLE 3

| Example | TPU-EST pbw | PP pbw | tri-Block pbw | Tensile Strength (Kpsi) | Elongation (%) |
|---|---|---|---|---|---|
| a | 6.0 | 4.0 | 0.0 | 1.36 | 128 |
| d | 5.5 | 4.0 | 0.5 | 2.10 | 181 |

Example 4

A composition in accordance with the invention containing a blend of 32 weight percent of TPU-EST, (Texin 455-D resin from Bayer Corporation) 63 wt % of a thermoplastic polyolefin (Dexflex 756, from D&S Plastics, having a MFR of 8.4 g/10 min. at 230° C. at 2.16 Kg) and 5 wt. % of a styrenic di-block copolymer was prepared by melt blending in the extruder. The di-block copolymer, representative of (a) above, contains about 43% (weight percent) styrene and about 57% butadiene. The properties of a comparative blend which contains 32 wt % of TPU-EST and 68 wt % of the same thermoplastic polyolefin are tabulated below for comparison—see Table 4.

TABLE 4

| | Example | |
|---|---|---|
| | e | f |
| TPU-EST wt % | 32 | 32 |
| PP wt % | 68 | 63 |
| di-Block wt % | 0.0 | 5.0 |
| Tensile Strength (Kpsi) | 1.1 | 1.5 |
| Elongation (%) | 85 | 174 |
| Impact Strength* ft.lb/inch | 3 | 11 |

*notched Izod ⅛" at room temperature

Example 5

In this example three blends were made by melt blending in a co-rotating twin-screw extruder. The components and the properties are summarized below in Table 5. The TPU- EST used in this series of composition was Texin 470-D resin, a product of Bayer Corporation and the thermoplastic polyolefin was Dexflex 756; the compatibilizing additive used in example "h" was a styrenic di-block copolymer containing about 43 wt % styrene and 57 wt % butadiene (noted in the table below as A) and the compatibilizer in example "i" was a mixture of equal parts of A (a diblock) and of a tri-block copolymer containing 16 wt % styrene and 84 wt % isoprene noted below as B. (A and B represent (a) and (b) of the invention)

TABLE 5

|  | Example | | |
| --- | --- | --- | --- |
|  | g | h | i |
| TPU-EST wt % | 32 | 32 | 32 |
| PP wt % | 68 | 63 | 63 |
| Block copolymer wt % | 0.0 | 5.0** | 5.0*** |
| Tensile Strength (Kpsi) | 2.5 | 3.2 | 3.3 |
| Elongation (%) | 105 | 326 | 336 |
| Impact Strength* ft.lb/inch | 3 | 4 | 4 |

*notched Izod 1/8" at room temperature
**compatibilizer A
***compatibilizer B

Example 6

In this example, four blends were made by melt blending in a 1.5" single screw laboratory extruder. The process temperature (°C.) profile was as follows:

| front | 225–250° C. |
| --- | --- |
| middle | 225–270° C. |
| rear | 175–185° C. |
| die temperature | 229–255° C. |

The TPU-EST was Texin 480-A resin from Bayer Corporation, the polypropylene was a homopolymer injection molding resin grade, Amoco 4018, MFR 13g/10 min at 230° C. at 2.16 Kg. The compatibilizers used were as follows:
A: styrenic di-block copolymer containing 43 wt % styrene and 57 wt % butadiene
B: styrenic tri-block copolymer containing 30 wt % styrene and 70 wt % isoprene
C: styrenic tri-block copolymer containing 65 wt % styrene and 35 wt % ethylene-propylene (representative of (a), (b) and (c) of the invention).

TABLE 6

|  | Example | | | |
| --- | --- | --- | --- | --- |
|  | j | k | l | m |
| TPU-EST wt % | 40 | 35 | 35 | 35 |
| PP wt % | 60 | 60 | 60 | 60 |
| Block copolymer wt % | 0.0 | 5.0** | 5.0*** | 5.0**** |
| Tensile Strength (Kpsi) | 1.8 | 1.5 | 1.9 | 2.2 |
| Elongation (%) | 221 | 348 | 340 | 405 |

TABLE 6-continued

|  | Example | | | |
| --- | --- | --- | --- | --- |
|  | j | k | l | m |
| Impact Strength* ft.lb/inch | 1 | 6 | 7 | 4 |

*notched Izod 1/8" at room temperature
**compatibilizer A
***compatibilizer B
****compatibilizer C Example 7

The following is a comparison between the properties of compatibilized and uncompatibilized blends. The uncompatibilized blend (A-below) contained 9 parts by weight of thermoplastic polyurethane (Texin 480-A from Bayer Corporation) and 1 part by weight of polypropylene. The compatibilized blend (B-below) contained the same components at the same amounts except that it additionally contained 0.5 parts by weight of Kraton 1125X represenative of (b) of the invention. The blends were handled and treated equally in the preparation of test molded specimens and the results of the evaluation are presented below.

TABLE 7

|  | A | B |
| --- | --- | --- |
| Property melt flow rate g/10 min. | 58.9 | 100.2 |
| hardness, shore A | 92 | 91 |
| Taber abrasion, mg | 873 | 526 |
| tensile strength, kpsi | 5.9 | 6.5 |
| % elongation | 486 | 549 |
| flexural modulus, kpsi | 16.3 | 21.0 |

It is within the skill in the art to practice this invention in numerous modifications and variations in light of the above teachings. It is understood that the various embodiments of this invention described herein may be altered without departing from the spirit and scope of this invention as defined by the following claims.

What is claimed is:

1. A homogenous thermoplastic molding composition comprising
   (i) about 30 to 90 percent TPU,
   (ii) about 10 to 70 percent of a polyolefin having a number average molecular weight of at least 10,000 and
   (iii) about 1 to 8 percent of a compatibilizing agent wherein said polyolefin is selected from the group consisting of
      (i) low density polyethylene
      (ii) high density polyethylene
      (iii) polypropylene
      (iv) poly-3-methylbutene-1-polybutene-1
      (v) poly-4-methylpentene-1
      (vi) copolymer of mono olefin with another monoolefin
      (vii) copolymer of olefin with a diolefin
      (viii) copolymer of olefin vinyl acetate, and
      (ix) copolymer of olefin with vinyl acrylate
   and wherein said compatibilizing agent comprises a second copolymer having a number average molecular weight of about 25,000 to 350,000 containing 1) blocks of monoalkylene arene having a number average molecular weight of about 5,000 to 125,000 and 2)

blocks having a number average molecular weight of about 10,000 to 250,000 selected from the group consisting of hydrogenated conjugated diene, and non-hydrogenated conjugated diene, said second copolymer having a structure selected from the group consisting of
(a) linear diblocks,
(b) linear and branched tri-blocks containing no hydrogenated conjugated diene blocks,
(c) linear and branched tri-blocks containing hydrogenated conjugated diene blocks wherein said blocks of monoalkylene arene comprise at least 56% relative to the weight of said triblock,
(d) radial block containing no hydrogenated conjugated diene blocks,
(e) radial block containing hydrogenated conjugated diene blocks wherein said monoalkylene arene blocks comprise at least 56% relative to the weight of said radial block,
(f) radial block containing hydrogenated conjugated diene blocks as end-groups,
(g) linear multi-blocks containing at least one hydrogenated conjugated diene as an end block, and
(h) linear multi-blocks containing non-hydrogenated conjugated diene wherein said multi-blocks comprise at least four blocks, and wherein monoalkylene arene is selected from the group consisting of styrene, methyl styrene and ring substituted styrene, and wherein diblock copolymers denote tapered and non-tapered segments, said percent being relative to the weight of said composition.

2. The composition of claim 1 wherein said polyolefin is selected from the group consisting of polyethylene and polypropylene.

3. The composition of claim 1 wherein said compatibilizing agent is a linear di-block copolymer.

4. The composition of claim 1 wherein said compatibilizing agent is a linear or branched tri-block copolymer containing no hydrogenated conjugated diene blocks.

5. The composition of claim 1 wherein said compatibilizing agent is a linear or branched tri-block copolymer containing at least one hydrogenated conjugated diene block and at least one block of monoalkylene arene wherein said blocks of monoalkylene arene comprise at least 56% relative to the weight of said tri-block.

6. The composition of claim 1 wherein said compatibilizing agent is a radial block copolymer which contains no hydrogenated conjugated diene blocks.

7. The composition of claim 1 wherein said compatibilizing agent is a radial block copolymer containing hydrogenated conjugated diene blocks and monoalkylene arene blocks wherein said monoalkylene arene blocks comprise at least 56% relative to the weight of said radial block.

8. The composition of claim 1 wherein said compatibilizing agent is a radial block copolymer containing hydrogenated conjugated diene blocks as end-groups.

9. The composition of claim 1 wherein said compatibilizing agent is a linear multi-block copolymer containing at least one hydrogenated conjugated diene as an end block.

10. The composition of claim 1 wherein said compatibilizing agent is a linear multi-block copolymer containing blocks of nonhydrogenated conjugated diene.

11. The molding composition of claim 1 wherein said polyolefin is an ethylene-propylene copolymer.

12. The molding composition of claim 1 wherein said polyolefin is selected from the group consisting of EPDM, ethylene-vinyl acetate copolymer; ethylene-butylene copolymer; ethylene-vinyl acrylate copolymer; propylene-4-methylpentene-1 copolymer; and their respective ionomers.

13. A homogenous thermoplastic molding composition comprising
(i) about 30 to 90 percent TPU,
about 10 to 70 percent of a polyolefin having a number average molecular weight of at least 10,000 and
(iii) about 1 to 8 percent of a compatibilizing agent wherein said polyolefin is selected from the group consisting of
(i) low density polyethylene
(ii) high density polyethylene
(iii) polypropylene
(iv) poly-3-methylbutene-1-polybutene-1
(v) poly-4-methylpentene-1
(vi) copolymer of mono olefin with another monoolefin
(vii) copolymer of olefin with a diolefin
(viii) copolymer of olefin with vinyl acetate, and
(ix) copolymer of olefin with vinyl acrylate, and wherein said compatibilizing agent comprises a second copolymer having a number average molecular weight of about 25,000 to 350,000 containing 1) blocks of monoalkylene arene having a number average molecular weight of about 5,000 to 125,000 and 2) blocks having a number average molecular weight of about 10,000 to 250,000 selected from the group consisting of hydrogenated conjugated diene, and non-hydrogenated conjugated diene, said second copolymer having a structure selected from the group consisting of
(a) linear di-blocks,
(b) linear and branched tri-blocks containing no hydrogenated conjugated diene blocks,
(d) radial block containing no hydrogenated conjugated diene blocks,
(f) radial block containing hydrogenated conjugated diene blocks as end-groups,
(g) linear multi-blocks containing at least one hydrogenated conjugated diene as an end block, and
(h) linear multi-blocks containing non-hydrogenated conjugated diene wherein said multi-blocks comprise at least four blocks, and wherein monoalkylene arene is selected from the group consisting of styrene, methyl styrene and ring substituted styrene, and wherein di-block copolymers denote tapered and non-tapered segments, said percent being relative to the weight of said composition.

14. The composition of claim 13 wherein the content of said monoalkylene arene is about 20 to 75 percent relative to the weight of said compatibilizing agent.

15. The composition of claim 13 wherein the content of said monoalkylene arene is about 40 to 70 percent relative to the weight of said compatibilizing agent.

16. The composition of claim 13 wherein said (i) is present in an amount of about 30 to 90 percent, and said (ii) is present in an amount of about 10 to 70 percent and said (iii) is present in an amount of about 2 to 5 percent.

17. The molding composition of claim 13 wherein said polyolefin is an ethylene-propylene copolymer.

18. The molding composition of claim 13 wherein said polyolefin is selected from the group consisting of EPDM, ethylene-vinyl acetate copolymer; ethylene-butylene copolymer; ethylene-vinyl acrylate copolymer; propylene-4-methylpentene-1 copolymer; and their respective ionomers.

* * * * *